United States Patent [19]

Eck et al.

[11] Patent Number: 6,020,403
[45] Date of Patent: Feb. 1, 2000

[54] PROCESS FOR PREPARING WATER-REDISPERSIBLE POWDER COMPOSITIONS COMPRISING ORGANOSILICON COMPOUNDS

[75] Inventors: Herbert Eck, Bad Toelz; Reiner Figge, Ampfing; Richard Weidner, Burghausen, all of Germany

[73] Assignee: Wacker-Chemie GmbH, Munich, Germany

[21] Appl. No.: 09/068,760

[22] PCT Filed: Nov. 14, 1996

[86] PCT No.: PCT/EP96/04998

§ 371 Date: Sep. 14, 1998

§ 102(e) Date: Sep. 14, 1998

[87] PCT Pub. No.: WO97/18258

PCT Pub. Date: May 22, 1997

[30] Foreign Application Priority Data

Nov. 14, 1995 [DE] Germany .................. 195 42 442

[51] Int. Cl.$^7$ ............................................... C08J 3/12
[52] U.S. Cl. .................... 523/340; 528/485; 528/488; 528/489; 528/501
[58] Field of Search ............................. 523/340; 528/485, 528/488, 489, 501

[56] References Cited

U.S. PATENT DOCUMENTS

| | | | |
|---|---|---|---|
| 4,027,067 | 5/1977 | Wagner | 428/407 |
| 4,704,416 | 11/1987 | Eck et al. | |
| 4,851,047 | 7/1989 | Demlehner | 106/111 |
| 5,096,493 | 3/1992 | Hyche | 106/271 |
| 5,290,604 | 3/1994 | Nielsen | 427/421 |
| 5,681,892 | 10/1997 | Weidner | 525/58 |

FOREIGN PATENT DOCUMENTS

| | | |
|---|---|---|
| 0228657 | 7/1988 | European Pat. Off. . |
| 0279373 | 8/1988 | European Pat. Off. . |
| 0680993 | 11/1995 | European Pat. Off. . |

OTHER PUBLICATIONS

Noll, "Chemie und Technologie der Silicone", Verlag Chemie GmgH, 2nd edition, Weinheim, 1968.

Houben–Weyl, "Methoden der organischen Chemie", vol. E20, p. 1782ff, 2219ff, Georg Thieme Verlag, Stuttgart: 1987.

*Primary Examiner*—Paul R. Michl
*Attorney, Agent, or Firm*—Burgess, Ryan & Wayne

[57] ABSTRACT

A process is provided for the preparation of powder compositions, containing organosilicon compounds and redispersible in water, by spray drying of an aqueous mixture containing one or a plurality of organosilicon compounds and one or a plurality of water-soluble organopolymers in the presence of antiblocking agents. The invention is characterized in that a portion of the antiblocking agent is conveyed to the dried powder stream, as long as it is still suspended in the stream of gas, or the remainder of the antiblocking agent is added to the dried powder.

3 Claims, 1 Drawing Sheet

PROCESS FOR PREPARING WATER-REDISPERSIBLE POWDER COMPOSITIONS COMPRISING ORGANOSILICON COMPOUNDS

BACKGROUND OF THE INVENTION

1) Field of the Invention

The invention relates to a process for preparing powder compositions which comprise organosilicon compounds and are redispersible in water.

2) Background Art

Water-redispersible powder compositions comprising organosilicon compounds are known, for example, from EP-A 228657 (U.S. Pat. No. 4,704,416) and EP-A 279373.

EP-A 228657 describes redispersible powders comprising organosilicon compounds, which powders are prepared by spray drying in the presence of a water-soluble organic polymer. For this purpose, a mixture of the organosilicon compounds with the organic polymer is atomized. To improve the blocking resistance of the redispersible powder, it is proposed that, during spray drying, the total amount of antiblocking agent be metered into the spray dryer separately from the aqueous mixture to be dried.

EP-A 279373 relates to water-redispersible organo(poly) siloxane-containing powders which are prepared by spray drying in the presence of a water-soluble organic polymer having a cloud point of from 35° C. to 98° C. To improve the blocking resistance, antiblocking agents are added to the powder. For this purpose, the following three alternatives for adding the antiblocking agent are described: the antiblocking agent is added together with organosilicon polymer and organic polymer to the aqueous mixture to be dried and is atomized as a mixture; it is metered in separately from the aqueous mixture during spray drying; it is metered into the lower part of the spray dryer before exit of the dried powder.

A further possible way of adding antiblocking agents to dispersible powders is to add them to the dried dispersible powder in a separate apparatus.

The methods mentioned have the following disadvantages: when the antiblocking agent is added during spray drying, in the aqueous mixture to be dried, the antiblocking agent cannot fully develop its activity since it is, like the organosilicon compound, present in microencapsulated form or is embedded in the water-soluble organic polymer. If the total amount of antiblocking agent is added separately therefrom at the top, a considerable part of the antiblocking agent is entrained in the air stream which flows out and has to be held back by means of expensive air filter units. When the total amount of the antiblocking agent is mixed in before exit of the dried powder, together with the cold air fed in to convey the dried powder, considerable encrustations and deposits caused by blocking of the powder occur on the dryer wall, on the cone and on the exit pipe from the spray dryer, which leads to long downtimes for cleaning. Mixing in the antiblocking agent after drying in a separate apparatus likewise leads to encrustations and deposits in the mixing apparatus.

It is therefore an object of the invention to provide a process for preparing redispersible powders comprising organosilicon compounds, which gives free-flowing and blocking-resistant powders using very small amounts of antiblocking agents, without the above-mentioned disadvantages occurring.

SUMMARY OF THE INVENTION

The invention provides a process for preparing water-redispersible powder compositions comprising organosilicon compounds by spray drying an aqueous mixture comprising one or more organosilicon compounds and one or more water-soluble organic polymers, in the presence of antiblocking agents, wherein part of the antiblocking agent is fed into the upper part of the dryer simultaneously with the aqueous mixture but separately from the latter and the remainder of the antiblocking agent is introduced into the dried powder stream while this is still suspended in the gas stream, or the remainder of the antiblocking agent is mixed into the dried powder.

DESCRIPTION OF THE PREFERRED EMBODIMENTS

Figure 1:
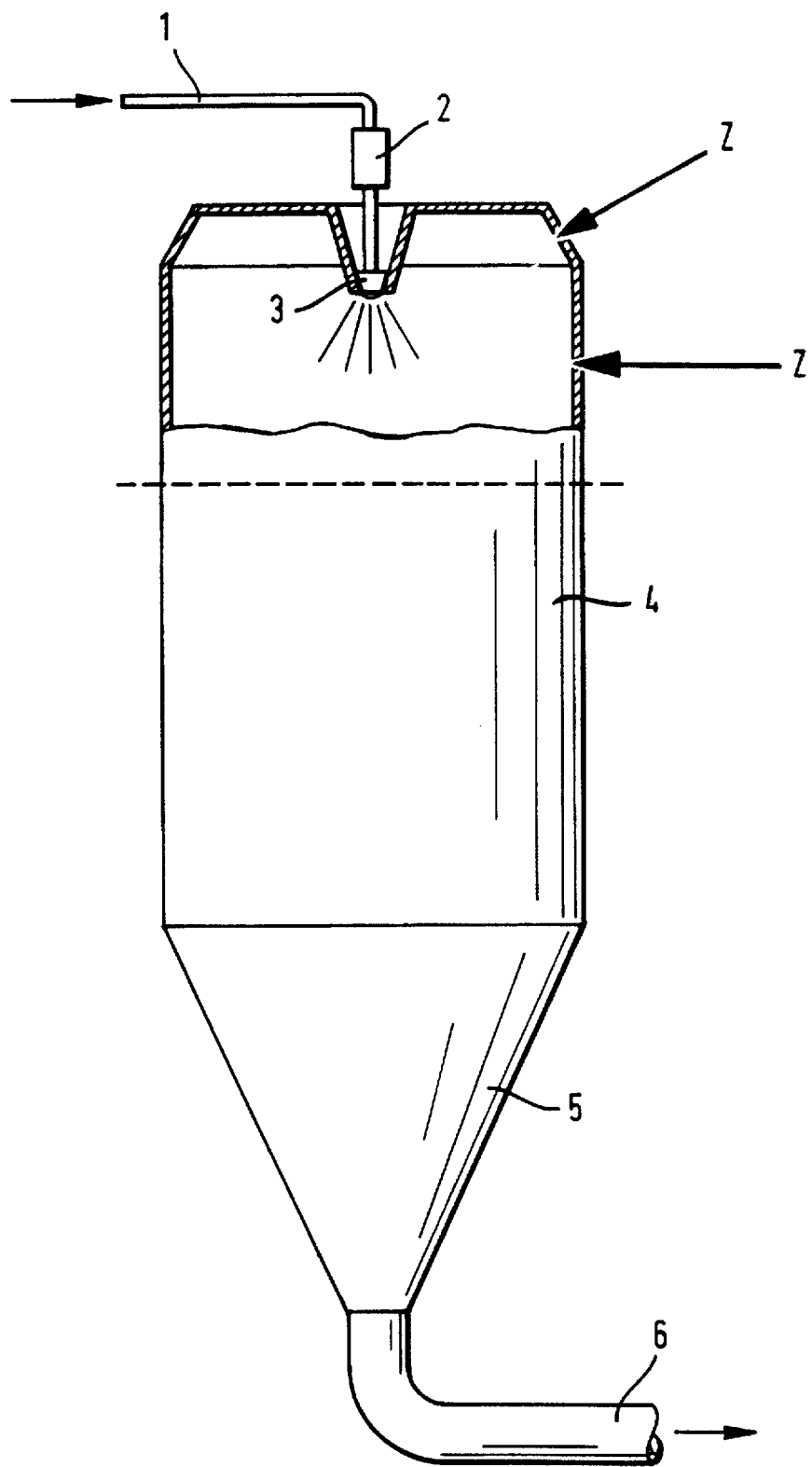

Adding part of the antiblocking agent continuously in the upper part of the dryer, but separately from the mixture to be dried, makes it possible to largely avoid the encrustations and deposits on the dryer wall. The addition of the other part of the antiblocking agent to the dried powder stream or to the dried powder ensures that the fine components of the antiblocking agent also remain in the product or are not carried out with the moist air, which results in a significant improvement in the blocking resistance.

Spray drying can be carried out in any apparatuses which are suitable for the spray drying of liquids and are frequently already known, for example those having at least one swirl nozzle for atomization or having a rotary atomizer disk, in a preferably heated drying gas stream such as air or nitrogen.

The spray dryers generally have the configuration shown in FIG. 1, namely an upright cylinder at the upper end of which the spraying device is located. The cylindrical part 4 corresponds to the drying space which usually ends in an outlet funnel 5. At the upper end of or above the cylindrical part 4, the dispersion to be dried together with compressed air is fed via a line 1, if desired via a filter 2, into the spraying device 3 and sprayed. The dry particles settle or are transported further by means of air via line 6 to separators. The separators are not shown in FIG. 1.

The drying rate and the properties of the finished product are largely dependent on the action of the spraying device. Single-fluid, two-fluid and multi-fluid nozzles and also rotary atomizers are all suitable for the process claimed. In this process, preference is given to using cocurrent spray dryers.

If the mixtures to be sprayed contain organic solvents such as toluene or xylene, spray drying is preferably carried out using nitrogen as drying gas stream. In this case, water and other vaporized materials can be condensed out from the drying gas stream and the gas can be recirculated.

Preferably, the inlet temperature of the drying gas stream is from 80° C. to 250° C., in particular from 110° C. to 190° C., and the outlet temperature of the gas stream formed during drying is from 40° C. to 100° C., in particular from 50° C. to 90° C.

The antiblocking agent or a mixture of antiblocking agents is introduced into the apparatus in which spray drying takes place separately from the aqueous mixture fed in for spray drying. The antiblocking agent is preferably added in amounts of from 3 to 30% by weight, particularly preferably from 5 to 20% by weight, based on the total weight of organosilicon compound and water-soluble polymer.

In the process of the invention, part of the antiblocking agent is fed in in the upper third of the spray dryer, preferably by means of hot air. This corresponds to the region which in FIG. 1 is at the level of or above the broken line. Preferred regions for the addition according to the invention in the upper part of the spray dryer are shown in FIG. 1 by means of arrows and Z. Preferably, from 20 to 50% by weight of the antiblocking agent is fed in in the upper third of the dryer.

The remainder of the antiblocking agent is metered in while the powder is still suspended in the gas stream or the antiblocking agent is mixed into the finished powder in a separate mixing apparatus. The remainder of the antiblocking agent is preferably introduced together with the air which conveys the powder into the separator installed downstream of the spray dryer, if desired together with further additives.

The organosilicon compounds used for preparing the powders of the invention or in the process of the invention can be, for example, those of the formula $R_aSi(OR^1)_{4-a}$, where R is hydrogen, a monovalent hydrocarbon radical which can have at least one substituent which is inert toward water at the respective drying temperature, $R^1$ are identical or different alkyl or alkoxyalkylene radicals each having from 1 to 4 carbon atoms per radical and a is from 0 to 4, preferably up to 3, with the proviso that such silanes have a boiling 5 point of at least 150° C. at 1020 hPa (abs.).

The organic silicon compounds used for preparing the powders of the invention or in the process of the invention can, for example, also be partial hydrolysates or hydrolysates or liquid or soluble, solid condensates of the above-mentioned silanes or silane mixtures.

The organic radicals R preferably contain at most 18 carbon atoms per radical. Examples of hydrocarbon radicals R are alkyl radicals such as the methyl, ethyl, n-propyl, isopropyl and 2-ethylhexyl radicals and also hexyl and octadecyl radicals, cycloalkyl radicals such as the cyclohexyl radical; aryl radicals such as the phenyl radical; arylalkyl radicals such as the benzyl radical. The radicals R mentioned can also be substituted by halogens such as F or Cl or by ether, thioether, ester, amide, nitrile, hydroxyl, amine, epoxide, carboxyl, sulfonic acid, carboxylic anhydride and carbonyl groups. Furthermore, the radicals R can also have one or more unsaturated carbon bonds.

Examples of substituted hydrocarbon radicals R are halogenated hydrocarbon radicals such as the 3,3,3-trifluoropropyl radical, 3-chloropropyl radical and also chlorophenyl radicals, 3-hydroxypropyl and 3-aminopropyl radicals; mercaptoalkyl radicals such as the 3-mercaptopropyl radical; and acyloxyalkyl radicals such as the 3-methacryloxypropyl radical. Further hydrocarbon radicals are those having at least one aliphatic carbon double bond, e.g. the vinyl or butadienyl radical. Particular mention here may be made of the compounds of the formulae:

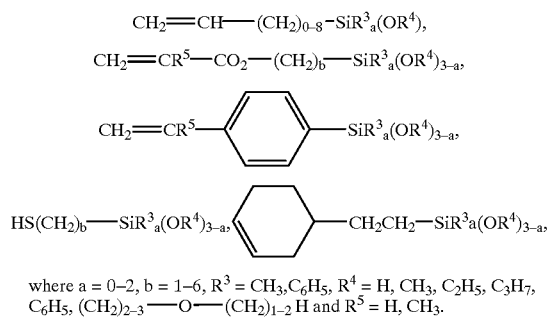

where a = 0–2, b = 1–6, $R^3$ = $CH_3,C_6H_5$, $R^4$ = H, $CH_3$, $C_2H_5$, $C_3H_7$, $C_6H_5$, $(CH_2)_{2-3}$—O—$(CH_2)_{1-2}$ H and $R^5$ = H, $CH_3$.

Examples of alkyl radicals $R^1$ are the methyl, ethyl, n-propyl, isopropyl, n-butyl, sec-butyl and tert-butyl radicals. Important examples of alkoxyalkylene radicals are the methoxyethylene radical and the 1-methoxy-2-oxypropyl radical.

Preferred organosilicon compounds are: tetraethoxysilane, methyltripropoxysilane, methyltri-(ethoxy)silane, γ-chloropropyltriethoxysilane, β-nitriloethyltriethoxysilane, γ-mercaptopropyltriethoxysilane and γ-mercaptopropyltrimethoxysilane, phenyltriethoxysilane, n- and iso-octyltriethoxysilane, dipropyldiethoxysilane, triphenylsilanol and also their preferably liquid condensation products, possibly with other low-boiling and/or water-soluble silanes such as methyltrimethoxy-silane, γ-aminopropyltriethoxysilane or other amino-functional silanes, silanes containing quaternary ammonium salt groups, silanes containing epoxy groups and silanes containing carboxylic acid and carboxylic acid anhydride functions.

Preferred organopolysiloxanes are:
the organopolysiloxane of the empirical formula $CH_3Si(OC_2H_5)_{0.8}O_{1.1}$ having an average molecular weight of about 600 g/mol and a viscosity of about 20 $mm^2 \cdot s^{-1}$ at 25° C.; the organopolysiloxane of the empirical formula $CH_3Si(OCH_3)_{0.8}O_{1.1}$ having an average molecular weight of about 650 g/mol and a viscosity of about 30 $mm^2 \cdot s^{-1}$ at 25° C.; the organopolysiloxane of the formula $C_6H_5Si(OC_2H_5)_{0.72}O_{1.14}$ having an average molecular weight of about 3000 g/mol and a viscosity of about 25,000 $mm^2 \cdot s^{-1}$ at 25° C.; the organosiloxane of the formula $R^2Si(OCH_3)_2O_{0.5}$ in which 70% by number of the radicals $R^2$ are methyl groups and 30% by number of the radicals $R^2$ are 2-ethylhexyl groups; and a methyl-hydrogenpolysiloxane terminated by trimethylsiloxy groups and having a viscosity of about 20 $mm^2 \cdot s^{-1}$ at 25° C.

A further example of organopolysiloxanes is a commercial copolymer consisting of 15.8 mol % of $C_6H_5SiO_{3/2}$, 42.1 mol % $(C_6H_5)$ $CH_3SiO_{2/2}$, 27.7 mol % of $(CH_3)_2SiO_{2/2}$ and 14.4 mol % of $(CH_3)_3SiO_{1/2}$ units and having a viscosity of 20 $mm^2 \cdot s^{-1}$ at 25° C. Mention may also be made of adhesive resins, for example the MQ resins such as REN 82 (brand name of Wacker-Chemie).

Further examples of organopolysiloxanes are dimethylpolysiloxanes or methylphenylpolysiloxanes terminated by hydroxydimethylsiloxy groups or/and ethoxydimethylsiloxy groups or trimethylsiloxy groups or γ-hydroxypropyl- or γ-aminopropyl- or vinyl- or hydrogendimethylsiloxy groups.

The organic silicon compounds used in the process of the invention can, for example, also be trimethylsiloxy-terminated methylhydrogenpolysiloxanes or trimethylsiloxy-terminated copolymers comprising dimethylsiloxane and methylhydrogensiloxane units.

Further suitable silicon compounds are disilanes, polysilanes, carbosilanes, polycarbosilanes and polysilylenedisiloxanes which are dispersible in water and have a boiling point at atmospheric pressure of >150° C. Examples which may be mentioned are: the disilanes dimethyltetraalkoxydisilane, tetramethyldialkoxydisilane, trimethyltrialkoxydisilane or their (co)condensates generally obtainable from the corresponding chloro compounds, and polysilanes of the formula $R_3Si(SiR_2)_nSiR_3$ with n=1–500, preferably up to 8, where R can also be $OR^1$ and R and $R^1$ can be as defined above.

In the process of the invention, the organosilicon compounds mentioned can be used individually or in admixture with one another. If, for instance, organosilicon compounds can be emulsified only with difficulty because of their high viscosity, or if they are solid at the temperature intended for emulsification, they can be brought to the desired viscosity either by mixing with or dissolving in low-viscosity silicon compounds. As an alternative, highly viscous organosilicon compounds can be dissolved in suitable organic solvents such as toluene, mixtures of xylene isomers, cyclohexane, petroleum ether, diacetone alcohol or butyl acetate.

The preparation of the organosilicon compounds mentioned is known and can be carried out by methods as are described in Noll, Chemie und Technologie der Silicone, 2nd edition 1968, Weinheim and Houben-Weyl, Methoden der organischen Chemie, volume E 20, p. 1782 ff, 2219 ff, Georg Thieme Verlag, Stuttgart, 1987.

The water-soluble polymers are preferably used in amounts of from 5 to 40% by weight, particularly preferably from 7 to 20% by weight, based on the total weight of the silicon compound(s) used for preparing the respective powder.

For the purposes of the present invention, water-soluble polymers are organic polymers which are soluble in water to an extent of at least 1% by weight at room temperature and at the pressure of the surrounding atmosphere.

As water-soluble, film-forming polymers to be used according to the invention, preference is given to polyvinyl alcohols prepared by saponification of polyvinyl acetate and having a saponification number (=amount of KOH in mg which is required for saponification of the remaining acetate groups) of from 100 to 240 and a viscometrically determined molecular weight of from 15,000 to 100,000.

Further examples of water-soluble polymers which can be used for preparing the redispersible powders are partially hydrolyzed polyvinyl acetate polymers modified with amino groups, carboxylic acid groups or alkyl groups; vinylpyrrolidone polymers, in particular polyvinylpyrrolidones having a molecular weight of from 5000 to 400,000; starches and starch derivatives such as hydroxyalkylated starches, sulfated starches, phosphated starches, starches which are both sulfated and phosphated, carboxymethylstarches, degraded starches, e.g. dextrins, water-soluble polyacrylates; water-soluble polymethacrylates, water-soluble poly (meth)acrylamides, polymaleates, polyvinyl sulfonates; water-soluble cellulose ethers such as carboxymethylcelluloses, hydroxyalkylcelluloses, methylcelluloses, cellulose mixed ethers; water-soluble proteins such as casein, soya proteins and gelatins; copolymers of styrene and maleic acid or styrene and fumaric acid; condensation products of sulfonated phenols, urea, further organic nitrogen bases and formaldehyde; water-soluble alkali metal and alkaline earth metal salts of naphthalenesulfonic acid-formaldehyde condensation products and of phenol-sulfonic acid-formaldehyde condensation products.

If a reduction in the redispersibility is wanted, use is made of, at least as additional protective colloids, the ammonium salts of copolymers of styrene and maleic acid and/or fumaric acid, of condensation products of sulfonated phenols or naphthalenes with formaldehyde or of other filmforming polymers which are water soluble due to an ammonium salt group. Water-soluble proteins which keratinize under the preparative and use conditions are also suitable for this purpose.

The water-soluble polymers used according to the invention are commercial products or can be prepared by methods customary in organic chemistry.

Suitable antiblocking agents are inorganic, solid materials having mean particle sizes of from 0.01 to 50 $\mu$m. Examples are aluminum silicates, colloidal silicon dioxide gel, pyrogenic silicon dioxide, milled clays, perlite, vermiculite, calcium sulfate, talc, cements, chalk powder, calcium/magnesium mixed carbonates or diatomaceous earth.

In addition to water-soluble polymers, organosilicon compounds and antiblocking agents, further materials can be co-sprayed or added during or after spray drying to prepare the redispersible powder compositions. Examples of such further materials are solvents which are immiscible with water, e.g. toluene, ionic and nonionic emulsifiers such as sodium lauryl sulfate, fungicides, antifoams, dyes, pigments and fillers such as chalk powder, calcium carbonate and quartz flour. The additives mentioned are normally each used in amounts of from 0.1 to 30% by weight, based on organosilicon compound.

In the mixtures to be sprayed, the amount of water is preferably from 45 to 95% by weight, based on the total weight of the mixture to be sprayed.

The powders prepared according to the invention can be used wherever silicon compounds emulsified in water or emulsifiable in water is advantageous, e.g. because of their hydrophobicizing action, their character as binders and also their good permeability to water vapor. The powders can be used in the dry state or in water-diluted form, for example as additives to clay, plaster, renders, concrete, including gas concrete or porous concrete; or in mixtures used for producing sand-lime bricks; or in paints. They can also, for example, be used for hydrophobicizing the surface of bulk materials such as perlites (expanded lava), vermiculites (expanded mica) or gas concrete granules. They are also suitable as antifoams for preventing or combating foam in aqueous media.

Furthermore, the powders of the invention or prepared according to the invention can be used in water-diluted form as binders for finely particulate inorganic materials such as sand or organic materials such as wood flour. Finally, the powders of the invention or prepared according to the invention can also be used as additives for adhesives.

EXAMPLE 1

325 g of an organopolysiloxane of the formula $CH_3Si(OC_2H_5)_{0.8}O_{1.1}$ having an average molecular weight of about 600 and a viscosity of about 20 $mm^2 \cdot s^{-1}$ at 25° C. were mixed with 300 g of a 10% strength, aqueous solution of a polyvinyl alcohol having a degree of hydrolysis of 87.5 mol % (molecular weight 25,000, viscosity at 20° C. in 4% strength aqueous solution of 5 mPa·s) to form an emulsion. 130 g of water were mixed into this emulsion and the stiff oil-in-water emulsion was admixed with a further 325 g of the organopolysiloxane. The resulting mixture was sprayed together with 650 g of a 10% strength aqueous polyvinyl alcohol solution (saponification number 190, molecular weight 26,000).

Spraying was carried out in a cocurrent spray dryer, with the emulsion being conveyed together with the polyvinyl alcohol solution into the swirl nozzle atomizer installed at the upper end of the spray dryer (Nubilosa AJM 014) and sprayed at a nozzle pressure of 5200 hPa (abs.) and a throughput of 2.5 l/h by means of air (air inlet temperature 170° C.). At the same time, 30 g of calcium/magnesium carbonate (4% by weight based on organopolysiloxane and polyvinyl alcohol) were metered in at the upper end of the spray dryer by means of compressed air. The dried powder/air mixture exited at a temperature of 85° C. into a collection vessel. The powder separated out there was mixed with a further 45 g of calcium/magnesium carbonate (6% by weight based on organopolysiloxane and polyvinyl alcohol).

The quality of the powder was assessed by determining the flowability and the blocking resistance.

To determine the flowability, the powder to be tested was, in accordance with DIN 53916, introduced into a funnel-shaped vessel having a capacity of 50 ml and an outlet nozzle having a diameter of 8 mm and the surface was struck flat using a glass rod. After opening the outlet flap, the time taken for the powder to run out of the funnel was determined. The flow-ability was assessed qualitatively.

To determine the blocking resistance, the dispersible powder was introduced into an iron tube having a screw cap and then loaded by means of a metal punch having an mm scale. After reading off the penetration depth of the metal punch by means of the mm scale, the apparatus was stored at 50° C. for 16 hours in a drying oven. After cooling to room temperature, the penetration depth of the metal punch was read off, the powder was removed from the tube and the blocking resistance was determined qualitatively by crushing the powder.

The blocking resistance was classified as follows:
A=blocking resistant
B =moderately blocking resistant
C=not blocking resistant.

In Example 1, a readily flowable powder having a high blocking resistance was obtained (blocking resistance A).

COMPARATIVE EXAMPLE 1

The procedure of Example 1 was repeated, except that spraying was carried out without addition of antiblocking agent and no antiblocking agent was added to the powder after spray drying. This resulted in a powder having a residual moisture content of 1.5% which was flowable but not blocking resistant (blocking resistance C).

COMPARATIVE EXAMPLE 2

The procedure of Example 1 was repeated, except that the total amount of 75 g of antiblocking agent was metered into the dryer from the top. The flowability was improved compared to Comparative Example 1, as was the blocking resistance, but the latter was, at B–C, significantly lower than in Example 1.

COMPARATIVE EXAMPLE 3

The powder obtained in Comparative Example 1 was admixed after drying with the total amount of 75 g of antiblocking agent. Compared to Comparative Examples 1 and 2, the flowability was improved. The blocking resistance was also improved but, at a value of B, was not sufficient and was significantly lower than in Example 1.

COMPARATIVE EXAMPLE 4

The procedure of Example 1 was repeated, except that no antiblocking agent was metered in at the upper end of the spray dryer. The total amount of calcium/magnesium carbonate was, in contrast, introduced with the air which conveys the powder after exit from the spray dryer into the separator installed downstream of the dryer. This gave a powder whose flowability corresponded to that of the product from Comparative Example 3. The blocking resistance was classified as B.

EXAMPLE 2

Example 1 was altered in that the 650 g of the organopolysiloxane was replaced by the same amount of a mixture of 2 parts by weight of the organopolysiloxane of Example 1 and 1 part by weight of isooctyltriethoxy-silane. During spray drying, half of the 75 g of the antiblocking agent (calcium/magnesium carbonate) was metered in at the top in a manner similar to Example 1 and half was added together with the cold air in the lower part of the dryer.

This gave a powder having good flowability and a high blocking resistance evaluated as A.

COMPARATIVE EXAMPLE 5

The experiment described in Example 2 was repeated, but the total amount of antiblocking agent was metered in at the top separately from the aqueous organosilicon/polyvinyl alcohol mixture. The flow-ability of the powder obtained was satisfactory but the blocking resistance was, at a grading of C, not satisfactory and was significantly lower than in Example 2.

EXAMPLE 3

1260 g of dimethylpolysiloxane terminated by hydroxydimethylsiloxy groups and having a viscosity of 1500 $mm^2 \cdot s^{-1}$ at 25° C. were emulsified into a solution of 200 g of polyvinyl alcohol prepared by partial saponification of polyvinyl acetate and having a saponification number of 190 and a molecular weight of about 26,000 in 4660 g of water. The resulting emulsion was converted into a powder at a nozzle pressure of 4300 hPa (abs.), a throughput of 2 l/h, an air inlet temperature of 165° C. and a gas outlet temperature of 85° C. 25 g of aluminum silicate were metered in at the upper end and the remaining 50 g of aluminum silicate were metered in in the lower part of the dryer together with the cold air. The flowability of the powder was good and the blocking resistance was, at A, very good.

COMPARATIVE EXAMPLE 6

Example 3 was repeated except that the total amount of aluminum silicate was metered in at the top during spray drying.

The flowability of the resulting powder was good, the blocking resistance was, at C, not satisfactory.

What is claimed is:

1. A process for preparing water-redispersible powder compositions comprising organosilicon compounds by spray drying an aqueous mixture comprising one or more organosilicon compounds and one or more water-soluble organic polymers, in the presence of antiblocking agents, wherein part of the antiblocking agent is fed in in the upper third of the dryer simultaneously with the aqueous mixture but separately from the latter and the remainder of the antiblocking agent is introduced into the dried powder stream while this is still suspended in the gas stream, or the remainder of the antiblocking agent is mixed into the dried powder.

2. The process as claimed in claim 1, wherein from 20 to 50% by weight of the antiblocking agent or a mixture of antiblocking agents, based on the total weight of the antiblocking agent, is fed in in the upper third of the dryer.

3. The process as claimed in claim 1, wherein the remainder of the antiblocking agent is introduced together with the air which conveys the powder into the separator installed downstream of the dryer.

* * * * *